United States Patent
Heo (10) Patent No.: US 6,951,267 B2
(45) Date of Patent: Oct. 4, 2005

(54) DAMPING FORCE-VARIABLE SHOCK ABSORBER

(75) Inventor: Jin-Hyuck Heo, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/749,230

(22) Filed: Dec. 30, 2003

(65) Prior Publication Data

US 2004/0231934 A1 Nov. 25, 2004

(30) Foreign Application Priority Data

May 22, 2003 (KR) ................................ 10-2003-0032488
Oct. 2, 2003 (KR) ................................ 10-2003-0068678

(51) Int. Cl.⁷ ............................ F16F 9/34; F16D 57/00
(52) U.S. Cl. .................... 188/266.3; 188/290; 188/286; 188/322.15; 188/322.19; 137/625.31
(58) Field of Search ........................... 188/322.15, 294, 188/286, 266.1, 266.2, 266.3, 266.4, 284, 290, 322.19; 137/625.3, 625.31

(56) References Cited

U.S. PATENT DOCUMENTS

| | | | | |
|---|---|---|---|---|
| 967,285 | A | * 8/1910 | Wilson ........................ | 188/283 |
| 2,148,891 | A | * 2/1939 | Applegarth ................. | 188/283 |
| 3,893,550 | A | * 7/1975 | San Pablo De La Rosa .... | 188/322.19 |
| 4,673,067 | A | * 6/1987 | Munning et al. ........ | 188/266.4 |
| 4,757,884 | A | * 7/1988 | Fannin et al. ............ | 188/282.4 |
| 4,946,134 | A | * 8/1990 | Orlandi ...................... | 251/208 |
| 5,244,063 | A | 9/1993 | Laurien et al. | |
| 5,295,705 | A | * 3/1994 | Butsuen et al. .......... | 188/266.4 |
| 5,360,089 | A | * 11/1994 | Nakamura et al. ....... | 188/266.4 |
| 5,529,154 | A | 6/1996 | Tanaka | |
| 5,857,665 | A | 1/1999 | Beck | |
| 5,921,359 | A | * 7/1999 | Holle ......................... | 188/300 |
| 6,298,958 | B1 | 10/2001 | Hwang | |
| 2003/0166432 | A1 | * 9/2003 | Patzer et al. ................ | 475/230 |
| 2004/0182662 | A1 | * 9/2004 | Heideman .................... | 188/285 |

FOREIGN PATENT DOCUMENTS

| | | |
|---|---|---|
| EP | 0 304 599 B1 | 9/1991 |
| GB | 2 343 231 A | 3/2000 |
| JP | 533823 A * | 2/1993 |

\* cited by examiner

*Primary Examiner*—Matthew C. Graham
*Assistant Examiner*—Melody M. Burch
(74) *Attorney, Agent, or Firm*—Morgan Lewis & Bockius LLP (57) ABSTRACT

A damping force-variable shock absorber comprises a cylinder and a piston rod inside the cylinder. The piston rod is linearly moveable relative to the cylinder. An orifice valve plate having a plurality of valve holes is configured and mounted so as to form a circle about the piston rod. A rotary valve plate having a plurality of radially-protruding projections is mounted about the piston rod and is rotatable with respect to the piston rod and the orifice valve plate. The rotary valve plate has a first and at least a second rotating state with respect to the orifice valve plate, wherein the plurality of valve holes respectively define a first opening and at least a second opening. A guide means for rotating the rotary valve plate between the first and the at least second rotating states is located between the rotary valve plate and the cylinder.

11 Claims, 10 Drawing Sheets

DAMPING FORCE-VARIABLE SHOCK ABSORBER

CROSS-REFERENCE TO RELATED APPLICATIONS

This application claims priority to Korean application No. 10-2003-0032488 and 10-2003-0068678, filed on May 22, 2003 and Oct. 2, 2003 respectively, the disclosures of which are incorporated fully herein by reference thereto.

FIELD OF THE INVENTION

The present invention relates to a shock absorber for use in suspension system of a vehicle, and more particularly, to a damping force-variable shock absorber.

BACKGROUND OF THE INVENTION

Shock absorbers and springs are components of a vehicle's suspension system. Together they absorb some of the shock transmitted from the vehicle's wheels and dampen, in advance, the expansion vibration of the springs in order to provide a comfortable ride to the vehicle's occupants.

The running condition of the vehicle changes according to variable factors such as road surfaces, vehicle speeds, steering conditions and the like. As a result, suspension systems having different characteristics are inevitably needed to meet the variable running conditions. In order to provide a suspension system capable of meeting the various running conditions, it is desirable to have a shock absorber capable of properly changing the damping force in relation to varying running conditions of the vehicle.

SUMMARY OF THE INVENTION

Embodiments of the present invention provide a damping force-variable shock absorber simple in construction and variable in damping force in relation to running conditions of a vehicle, thereby embodying characteristic changes of suspension systems required in various running conditions of a vehicle in a reasonable cost.

In preferred embodiment of the present invention, a damping force-variable shock absorber comprises a piston rod having a proximal end and a distal end mounted for linear movement inside a cylinder and an orifice valve plate having a plurality of valve holes intermittently formed along a circle about the piston rod and secured at the piston rod. A rotary valve plate is mounted with a plurality of radially protruding protruders or projections about the piston rod. The rotary valve plate is rotatably disposed with respect to the piston rod and the orifice valve plate, with the rotary valve plate near the orifice valve plate. The rotary valve plate has a first rotating state with respect to the orifice valve plate wherein each of the valve holes define a first opening. The rotary valve plate has at least a second rotating state with respect to the orifice valve plate wherein each of the valve holes define at least a second opening different than the first opening. A guide means is mounted between the rotary valve plate and the cylinder so that rotating state of the rotary valve plate relative to the orifice valve plate can be varied between the first and second rotating states.

The piston rod is preferably secured to a vehicle body, and the shock absorber may further comprise a rotation restriction means for restricting rotary movement of the piston rod relative to the vehicle body. The rotation restriction means is preferably mounted between the piston rod and the vehicle body. At least a portion of the piston rod preferably defines a circular cross-section and the rotary restriction means may comprise a key contact surface formed at the distal end of said piston rod. In a preferred embodiment, each of the plurality of valve holes are substantially long and circularly arc-shaped.

Preferably, the projections of the rotary valve plate are arranged at a substantially equal interval along a circle about the piston rod. Even more preferably, the projections are substantially fan-shaped. In a preferred embodiment, the shock absorber further comprises a bearing interposed between the rotary valve plate and the piston rod. A snap ring may be engaged with the piston rod for preventing the linear movement of the rotary valve plate along the piston rod. The piston rod may further be provided with a piston valve having an orifice and a disc.

In a preferred embodiment, the guide means may comprise a protruder or a tip formed on at least one of the projections of the rotary valve plate and a plurality of guide grooves formed at an inner wall of the cylinder. In addition, the tip may be engaged with at least one of the guide groove. The plurality of guide grooves may have at least one straight section formed in parallel along a longitudinal direction of the cylinder and at least one curved section formed along a longitudinal direction of the cylinder. In another preferred embodiment, the guide grooves may comprise a first straight section formed in parallel along a longitudinal direction of the cylinder and at a longitudinal midsection of the cylinder. In addition, the guide grooves may include an incline section formed along and inclined relative to the longitudinal direction of the cylinder, the incline section preferably vertically extending under and above relative to the first straight section. Moreover, the guide grooves may include a second straight section formed in parallel along the longitudinal direction of said cylinder, extending under and above relative to said incline section.

Preferably, the orifice valve plate may include a ring-shaped cushion part made of cushioning material, the cushion part extending distally.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE PREFERRED EMBODIMENTS

Hereinafter, preferred embodiments of the present invention will be described in detail with reference to the accompanying drawings.

Figure 1:
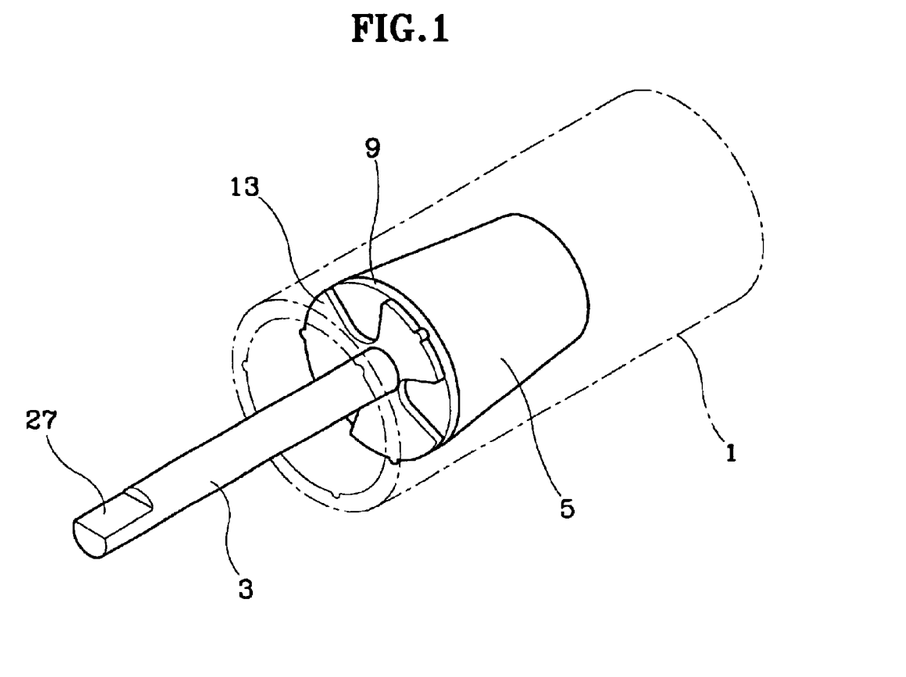
FIG. 1 is a schematic drawing of a damping force-variable shock absorber according to the present invention.

Shown in FIG. 1 is an illustrative embodiment of a damping force-variable shock absorber according to the present invention, wherein a piston rod 3 is located inside cylinder 1 for relative linear movement with respect to one another. The piston rod 3 is mounted with a plurality of parts, described in greater detail below, and the cylinder 1 is filled with an operational fluid (not shown).

Figure 2:
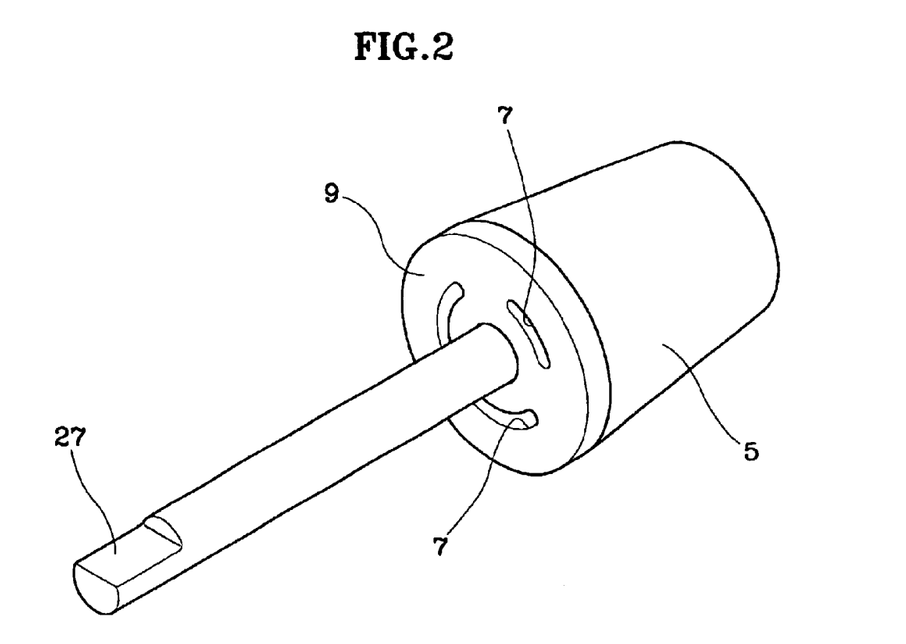
FIG. 2 is a schematic drawing of a piston valve and an orifice valve plate mounted to a piston rod according to the present invention.

As shown in both FIGS. 1 and 2, the piston rod 3 is mounted with a piston valve 5. Piston valve 5 may be equipped with an orifice and a disc as is known in the art with respect to conventional shock absorbers. An orifice valve plate 9, preferably located substantially near to and distal of the piston valve 5, may be equipped with a plurality of valve holes 7 intermittently formed along a circle about the piston rod 3. Orifice valve plate 9 is preferably secured so as to prevent both rotatable and linear movement relative to the piston rod 3.

Figure 3:
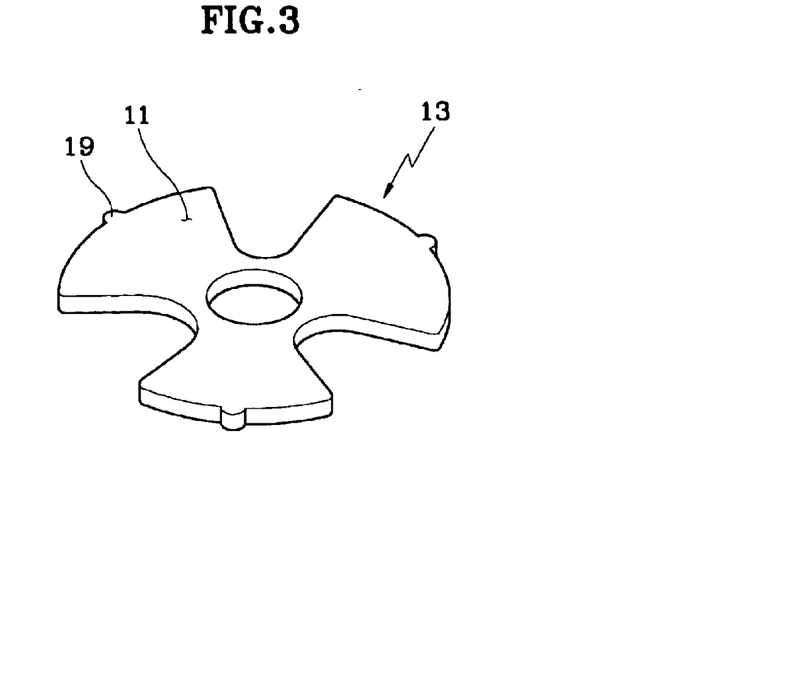
FIG. 3 is a schematic drawing of a rotary valve plate according to the present invention.

The valve holes 7 are preferably long and circularly-arc shaped. The valve holes 7 are preferably arranged at an equal interval along a circle about the piston rod 3 relative to one another. The rotary valve plate 13 is mounted in a rotatable state relative to the piston rod 3. Rotary valve plate 13 may be further equipped with a plurality of radially protruding protruders or projections 11, as shown in FIG. 3, about the piston rod 3 for varying the openness or size of the openings of the valve holes 7 due to the relative rotation of the orifice valve plate 9.

Figure 8:
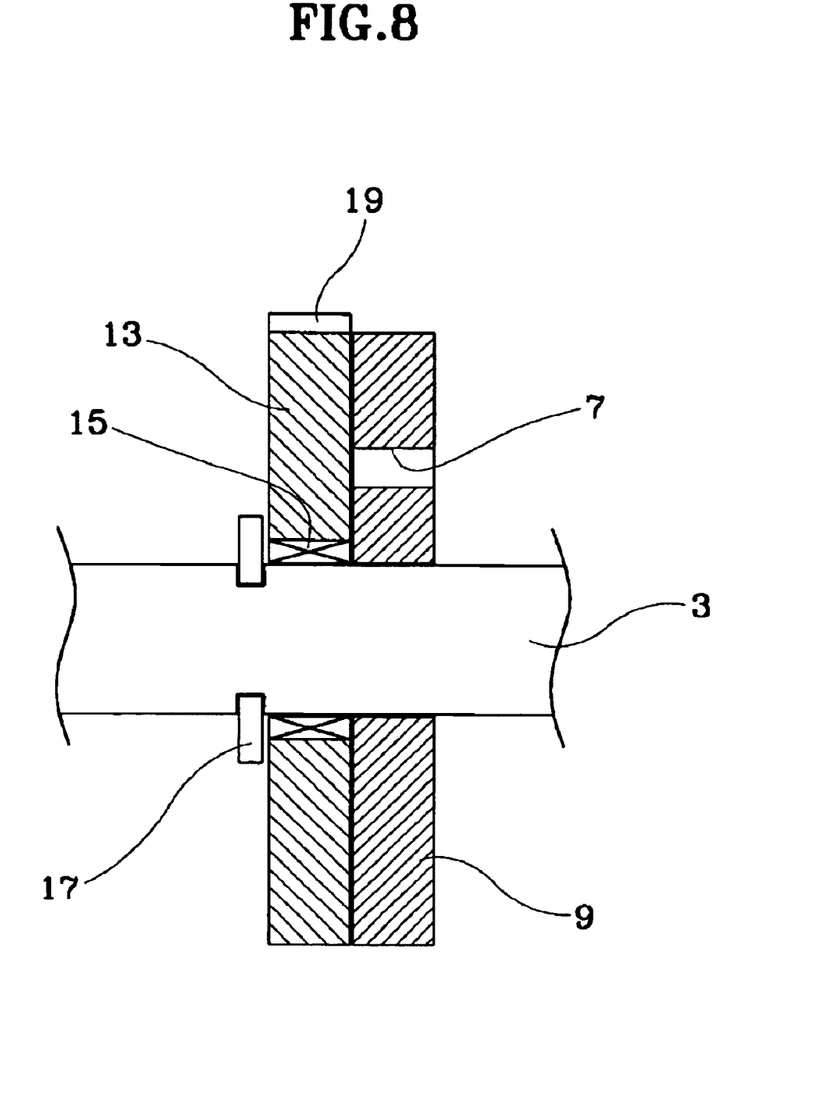
FIG. 8 is a schematic view of the rotary valve plate of FIG. 3 mounted to the piston rod of FIG. 2.

The projections 11 of the rotary valve plate 13 are arranged at an equal interval along a circle about the piston rod 3, and are substantially fan-shaped. The rotary valve plate 13 may be secured to the piston rod as is shown in FIG. 8. A bearing 15 is interposed between the rotary valve plate 13 and the piston rod 3, and the piston rod 3 is mounted with a snap ring 17 for preventing the linear movement of the rotary valve plate 13 along the piston rod 3.

Figure 4:
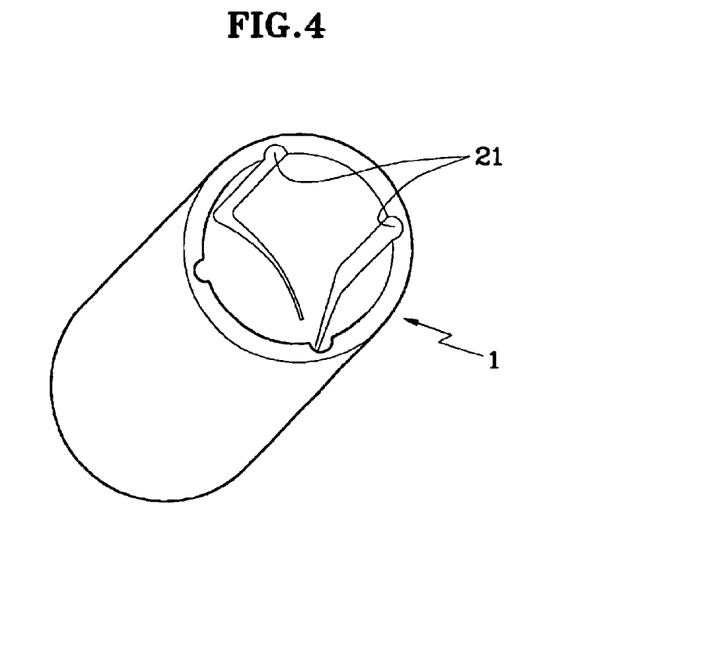
FIG. 4 is a schematic drawing of a cylinder according to the present invention.
Figure 5:
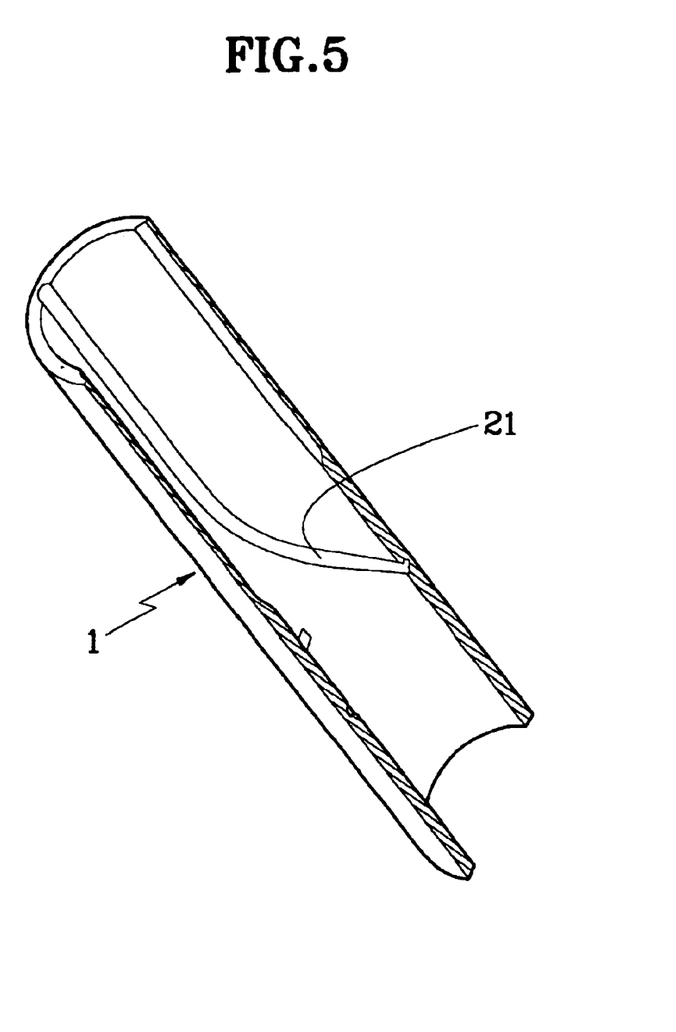
FIG. 5 is a perspective cross-sectional view of the cylinder of FIG. 4.
Figure 6:
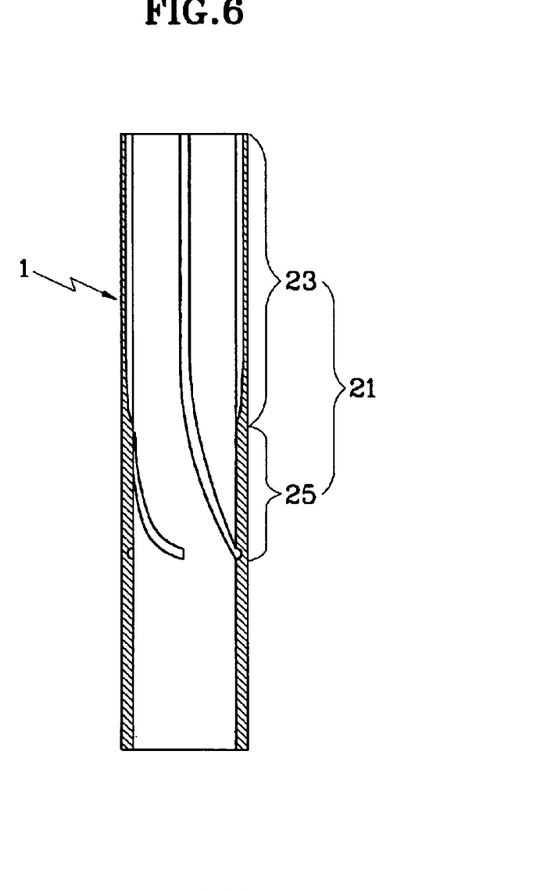
FIG. 6 is a cross-sectional view of the cylinder of FIG. 4.

Between the rotary valve plate 13 and the cylinder 1, there is disposed guide means for varying the rotating state of the rotary valve plate 13 relative to the orifice valve plate 9. Referring now to FIGS. 3 and 4, the guide means may include a protruder or tip 19 mounted and/or integrally formed at the projection 11 of the rotary valve plate 13 and a guide groove 21 formed at an inner wall of the cylinder 1. The tip 19 is to be inserted into guide groove 21. As illustrated in FIG. 6, the guide groove 21 preferably includes a straight section 23 formed in parallel along the longitudinal direction of the cylinder 1 and a curve section 25 curvedly formed along the longitudinal direction of the cylinder 1.

The curved section 25 is preferably arranged underneath the straight section 23 when the cylinder 1 is mounted to a vehicle. The curved section 25 is configured so that as the tip 19 moves along the curved section 25 of the guide groove 21, the rotary valve plate 13 is slowly rotated relative to the piston rod 3.

Figure 7:
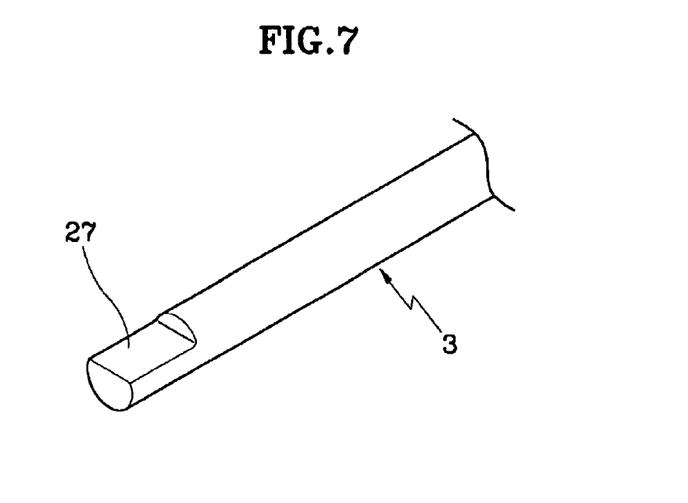
FIG. 7 is a partial perspective view of the distal end of the piston rod of FIG. 2.

Preferably the piston rod 3 is secured to a vehicle body and the cylinder 1 is fixed to a knuckle where the steering wheel is mounted (not shown) as is understood in the art. The piston rod 3 is preferably rotationally restrained or restricted in relation to the vehicle body by a rotation limiting means. In a preferred embodiment, the rotating limiting means comprises a key contact surface 27 at a distal end of the piston rod 3 having a circular cross-sectional view as illustrated in FIG. 7.

In one configuration, for example, a key hub may be provided and configured such that a flat key can be inserted into a space between the key contact surface 27 of the piston rod 3 and the key hub, whereby the rotating movement of the piston rod 3 can be restricted relative to the vehicle body. The structure and manner in which the cylinder 1 may be coupled to the knuckle may be substantially the same as that known in the art. The cylinder 1 may be mounted for example, by a knuckle bracket encompassing a peripheral surface of the cylinder 1. The knuckle bracket may then be secured to a knuckle via a bolt. This structure prevents relative rotation between the cylinder 1 and the knuckle. Any steering motion of the knuckle is transmitted to rotational movement of the cylinder 1 thereby generating a relative rotation between the piston rod 3 and the cylinder 1.

The construction as described above comprising the cylinder 1, hydraulic fluid, the piston rod 3 and a plurality of parts mounted at the piston rod 3 functions as a shock absorber capable of a variable damping force. In an alternative embodiment, the shock absorber structure may have both an inner cylinder and an outer cylinder wherein the inner cylinder is configured as cylinder 1 described above thereby providing a shock absorber capable of variable damping force.

The damping force-variable shock absorber may exercise damping force-variable operations according to at least two operational states (one is a steered traveling state and the other is a straight traveling state). In the steered traveling state, a damping force-variable operation is provided according to changes of steering angle.

Figure 9:
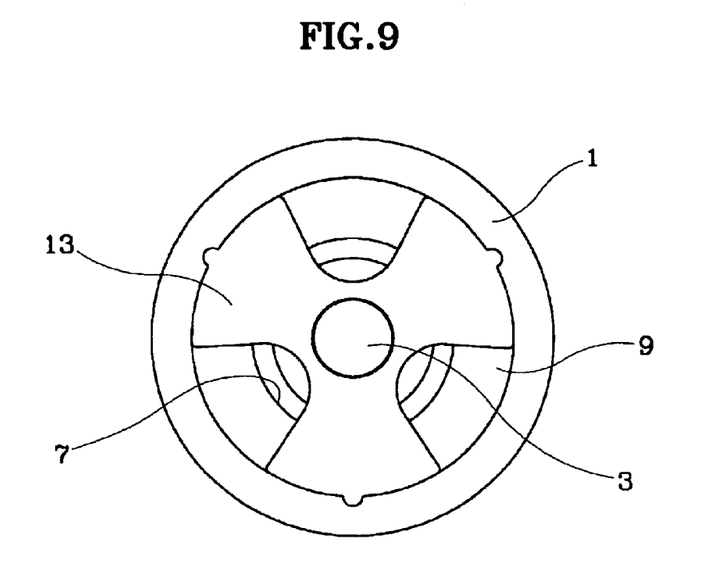
FIGS. 9 and 10 are schematic drawings showing the operational states of the damping force-variable shock absorber of FIG. 1.
Figure 10:
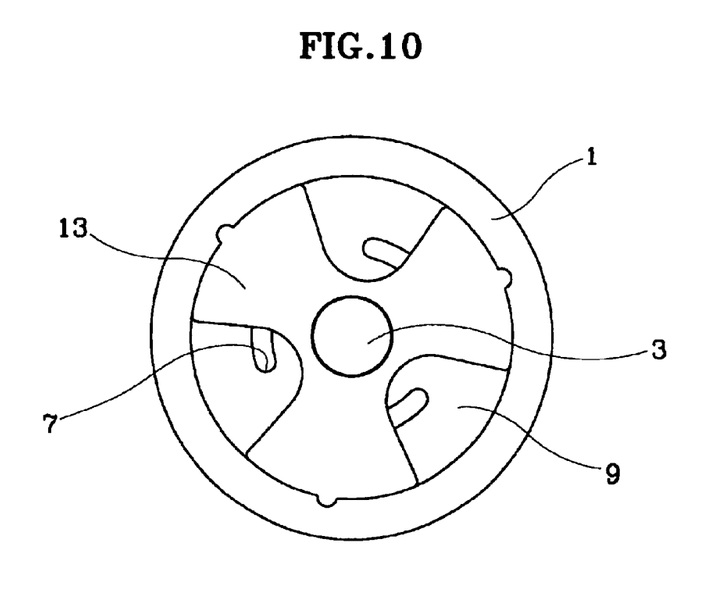

In the straight traveling state, the rotary valve plate 13 may be positioned relative to the orifice valve plate 9 such that the plurality of valve holes 7 are opened to a maximum, as shown in FIG. 9. When the steering angle is changed, rotation of the knuckle transmits rotation to the cylinder 1. The cylinder 1 in turn comes to rotate the rotary valve plate 13 via the guide groove 21. The orifice valve plate 9 is preferably fixed to the vehicle body via the piston rod 3. Accordingly, as shown between FIGS. 9 and 10, the relative rotation between the orifice valve plate 9 and the rotary valve plate 13 reduces the degree of the openness or size of the opening defined by the valve holes 7.

The degree to which the opening of the valve holes 7 is reduced is proportional to the size of the steering angle. As a result, the shock absorber can provide a strong damping force in response to an increased steering angle and thus a stable turning condition for the vehicle. Accordingly, in the straight traveling state, the weak damping force provides for a soft riding condition of the vehicle.

In addition or alternatively to, the damping force may be variable during the straight running state. When a knuckle rises in response to sudden bad road conditions during the straight travelling state of the vehicle so as to raise the cylinder 1, the tip 19 of the rotary valve plate 13 mounted at the piston rod 3 moves from the straight linear section 23 of the guide groove 21 to the curved section 25. Within the curved section 25, the rotary valve plate 13 rotates, to thereby reduce the openness of the valve holes 7 at the orifice valve plate 9 as comparatively illustrated in FIGS. 9 and 10.

As a result, even when the vehicle's wheels are significantly raised during the straight traveling state, the shock absorber according to the present invention can provide an accordingly varied damping force automatically to provide an improved comfortable ride.

Figure 11:
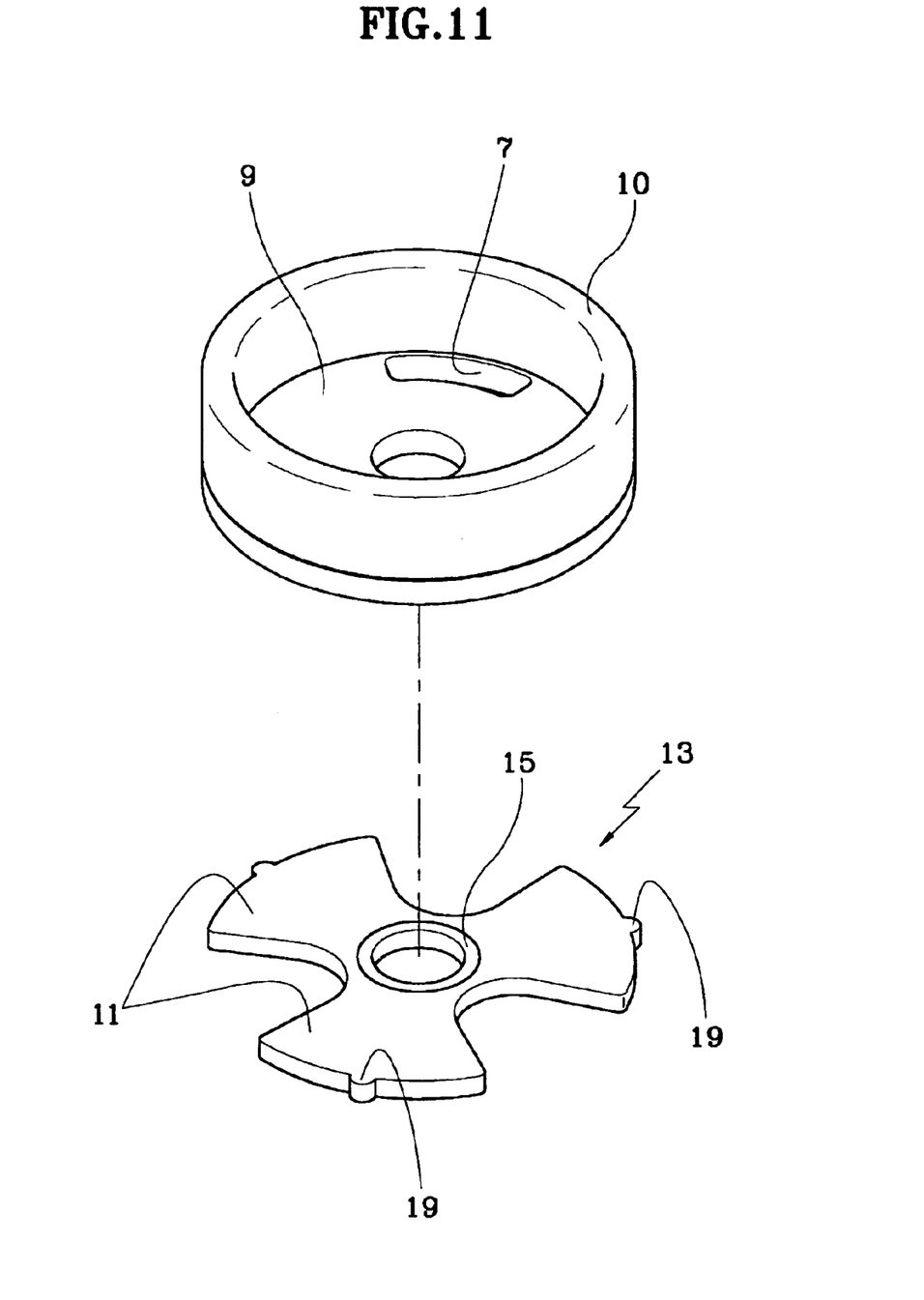
FIG. 11 is a partially exploded perspective view of the rotary valve plate of FIG. 3 with the orifice valve plate of FIG. 2 mounted with a cushion part.
Figure 12:
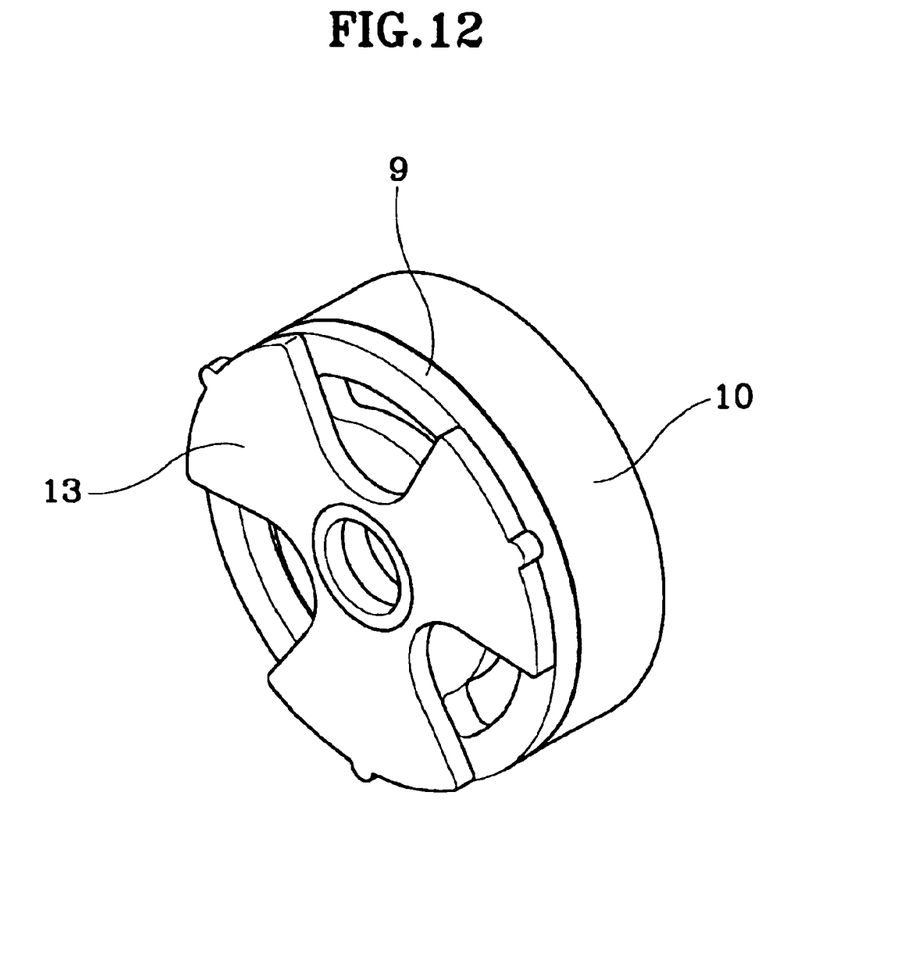
FIG. 12 is a perspective view of the assembled orifice valve plate mounted with a cushion part and rotary valve plate of FIG. 12.

In addition to the embodiment of the present invention as described, a marginal portion of the orifice valve plate 9 may be coupled with a ring-shaped cushion part 10 made of cushioning material, the cushion part 10 being protruded upwards relative to the shock absorber as illustrated in FIGS. 11 and 12. The knuckle is thereby lowered to cause the cushion part 10 to function as a kind of cushioning stopper, thereby enabling to alleviate the shock or impact transmitted to a vehicle body via the shock absorber.

Figure 13:
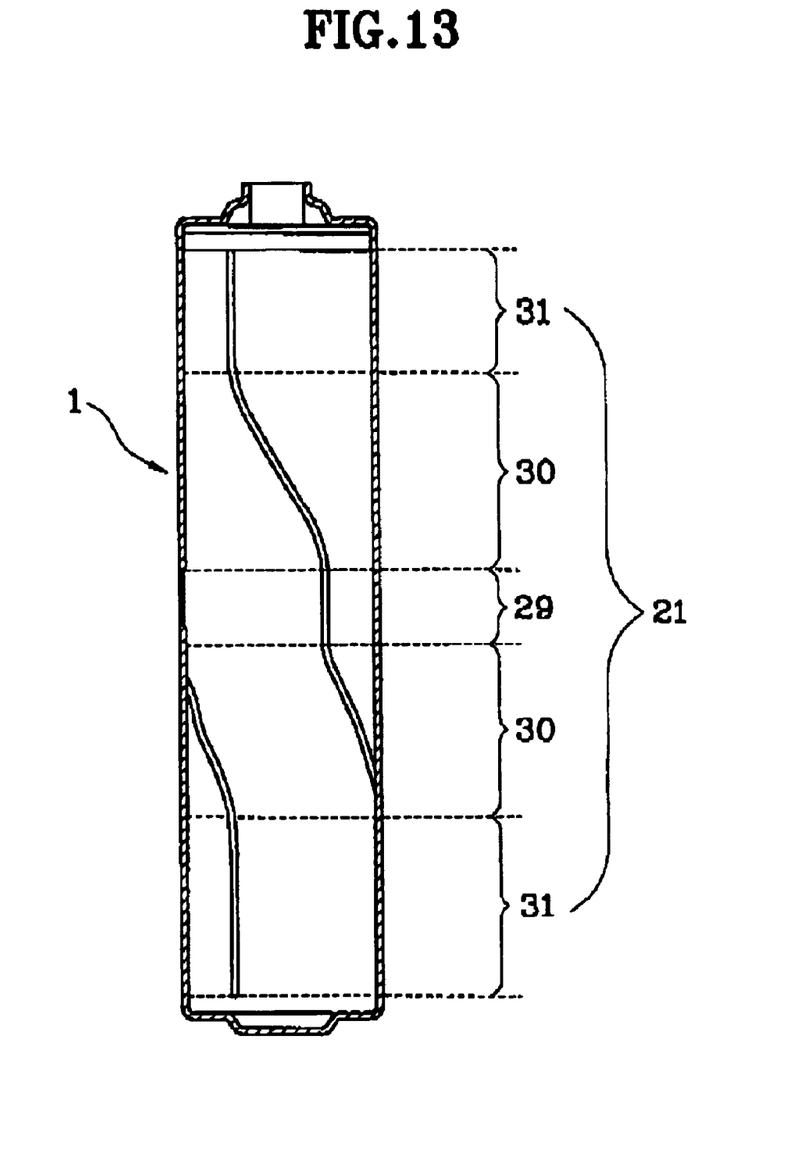
FIG. 13 is a schematic view a cylinder with a guide groove according to another embodiment of the present invention.

FIG. 13 is a schematic view for illustrating another embodiment of a guide groove of cylinder 1. The guide groove 21 includes a first straight section 29 formed in parallel at a longitudinal midsection of cylinder 1. An incline section 30 slantly is formed along a longitudinal direction of the cylinder and vertically extends from under and above the first straight section 29. A second straight section 31 extends from under and above the incline section 30 and is formed in parallel along a longitudinal direction of the cylinder 1.

Figure 14:
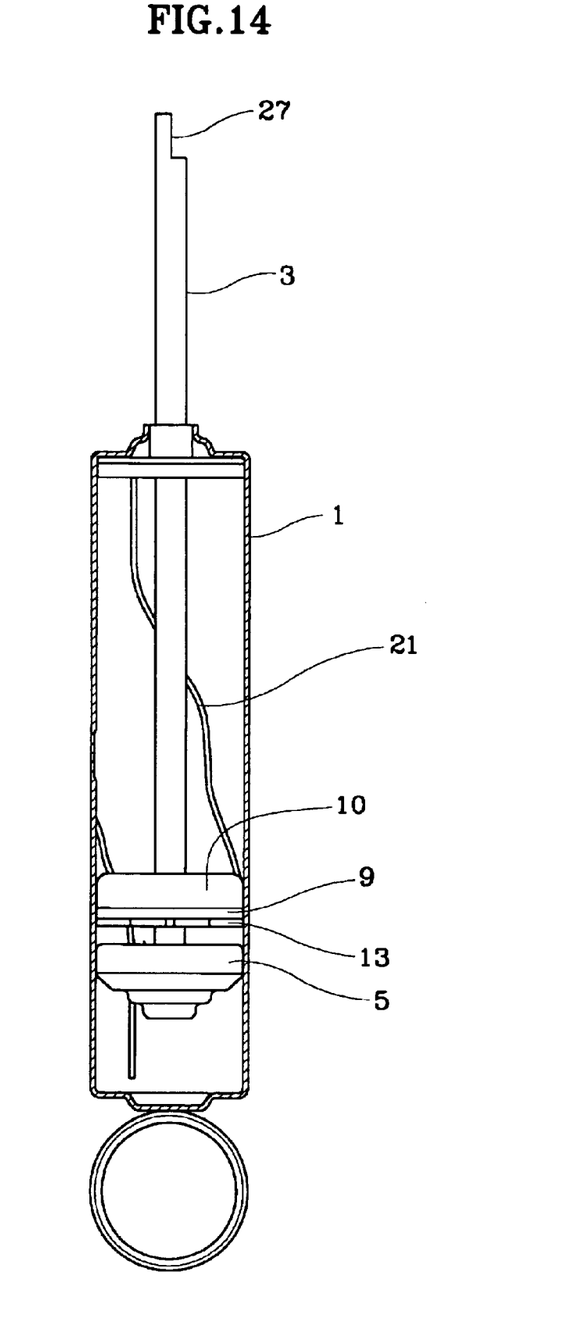
FIG. 14 is a cross-sectional view a shock absorber according to another embodiment of the present invention with the cushion part, the orifice valve plate and the guide groove of FIGS. 11 to 13.

FIG. 14 illustrates a shock absorber coupled with the orifice valve plate 9 equipped with the cushion part 10 shown in FIGS. 11 and 12 and the cylinder 1 having the guide groove 21 illustrated in FIG. 13.

The shock absorber shown in FIG. 14 acts in the same principle as that of the afore-mentioned shock absorbers.

The degree to which the valve holes 7 are open at the orifice valve plate 9 is decreased to gradually increase the damping force as the tip 19 at the rotary valve plate 13 moves from the first straight section 29 to the incline section 30 in response to vertical movement of the knuckle.

When the vertical movement of the knuckle is further increased to prompt the tip 19 of the rotary valve plate 13 to pass the incline section 30 and to move to the second straight section 31, openings of the valve holes 7 at the orifice valve plate 9 may be substantially closed and preferably be completely closed. Under these circumstances, the shock absorber acts as a kind of a hydraulic spring.

When the tip 19 of the rotary valve plate 13 is moved to the second straight section 31 such that the tip 19 is positioned at an upper side of the cylinder 1, and when the cylinder 1 further descends by leak of operational fluid between the orifice valve plate 9 and the rotary valve plate 13, the cushion part 10 disposed at the marginal area of the orifice valve plate 9 contacts an inner upper wall of the cylinder 1 to act as a cushion, thereby reducing the shock transmitted to the vehicle body via the shock absorber.

As apparent from the foregoing, an advantage in the damping force-variable shock absorber according to the present invention is that the damping force-variable shock absorber is simple in construction and provides a variable damping force in response to variable running conditions of a vehicle, such as turning of the vehicle, bad road condition and the like. The damping force-variable shock absorber according to the present invention may thereby provide a suspension system with the desired variable characteristics to respond to the various operating conditions of the vehicle at a reasonable cost.

What is claimed is:

1. A damping-force variable shock absorber comprising:
a cylinder having an inner wall;
a piston rod having a proximal end and a distal end, the piston rod being mounted inside said cylinder and configured for linear movement relative to said cylinder;
an orifice valve plate having a plurality of valve holes, the orifice valve plate being configured and mounted about said piston rod such that said plurality of valve holes form a circle about said piston rod;
a rotary valve plate having a plurality of radially-protruding projections, said rotary valve plate being mounted about said piston rod so as to be rotatable with respect to said piston rod and said orifice valve plate, said rotary valve plate having a first rotating state with respect to said orifice valve plate such that said plurality of valve holes define a first opening, said rotary valve plate having at least a second rotating state with respect to said orifice valve plate such that said plurality of valve holes define at least a second opening different from the first opening; and
a guide means for rotating rotary valve plate between said first rotating state and said at least second rotating state relative to said orifice valve plate, the guide means being between said rotary valve plate and said cylinder;
wherein said guide means comprises a tip formed on at least one of said projections of said rotary valve plate, and a plurality of guide grooves formed at said inner wall of said cylinder, wherein further said tip is engaged with at least one of said guide grooves.

2. The shock absorber as defined in claim 1, wherein the shock absorber further comprising a rotation restriction means for restricting rotary movement of said piston rod.

3. The shock absorber as defined in claim 2, wherein at least a portion of said piston rod defines a circular cross-section and said rotary restriction means comprises a key contact surface formed at the distal end of said piston rod.

4. The shock absorber as defined in claim 1, wherein each of said plurality of valve holes are substantially elongated and circularly arc-shaped, said plurality of valve holes being arranged at a substantially equal interval along a circle about said piston rod.

5. The shock absorber as defined in claim 1, wherein said projections of said rotary valve plate are arranged at a substantially equal interval along a circle about said piston rod, said projections being substantially fan-shaped.

6. The shock absorber as defined in claim 1, further comprising a bearing interposed between said rotary valve plate and said piston rod, and a snap ring engaged with said piston rod for preventing the linear movement of said rotary valve plate along said piston.

7. The shock absorber as defined in claim 1, wherein said plurality of guide grooves have at least one straight section formed in parallel along a longitudinal direction of said cylinder and at least one curved section formed along a longitudinal direction of said cylinder.

8. The shock absorber as defined in claim 1, wherein said guide grooves comprise:
a first straight section formed in parallel along a longitudinal direction of said cylinder and at a longitudinal midsection of said cylinder;
an incline section formed along and inclined relative to the longitudinal direction of said cylinder, said incline section vertically extending under and above relative to said first straight section; and a second straight section formed in parallel along the longitudinal direction of said cylinder, said second straight section extending under and above relative to said incline section.

9. The shock absorber as defined in claim 1, wherein said orifice valve plate includes a ring-shaped cushion part made of cushioning material, said cushion part extending distally.

10. A damping-force variable shock absorber comprising:

a cylinder defining a longitudinal axis and having an inner wall, said inner wall including at least one groove extending longitudinally;

a piston rod having a proximal end and a distal end, the piston rod being mounted inside said cylinder and configured for linear and rotational movement relative to said cylinder;

an orifice valve plate having a plurality of valve holes, the orifice valve plate being mounted about said piston rod;

a rotary valve plate having at least one radially-protruding projection engaged with said at least one groove, said rotary valve plate being mounted about said piston rod so as to be rotatable with respect to said piston rod and said orifice valve plate, said rotary valve plate having a first rotating state with respect to said orifice valve plate such that said plurality of valve holes defines a first opening, said rotary valve plate having at least a second rotating state with respect to said orifice valve plate such that said plurality of valve holes defines at least a second opening different from the first opening; and wherein said engagement of said projection with at least a portion of said at least one groove causes rotation of said rotary valve plate from said first rotating state to said at least second rotating state relative to said orifice valve plate.

11. The damping-force variable shock absorber of claim 10, wherein the second opening is smaller than the first opening.

* * * * *